May 1, 1951        J. ROSAN        2,550,867

FLUSH HEAD LOCKED-IN FASTENING DEVICE

Filed Aug. 12, 1948        2 Sheets-Sheet 1

JOSEPH ROSAN,
INVENTOR.

BY
ATTORNEY

May 1, 1951   J. ROSAN   2,550,867
FLUSH HEAD LOCKED-IN FASTENING DEVICE
Filed Aug. 12, 1948   2 Sheets-Sheet 2

JOSEPH ROSAN,
INVENTOR.

BY
ATTORNEY

Patented May 1, 1951

2,550,867

UNITED STATES PATENT OFFICE 2,550,867

FLUSH-HEAD LOCKED-IN FASTENING DEVICE

Joseph Rosan, Balboa Island, Calif.

Application August 12, 1948, Serial No. 43,896

5 Claims. (Cl. 151—32)

The present invention deals generally with fastening devices in the nature of bolts and nuts, particularly those designed to be installed and locked in a flush-head position.

Flush head bolts as known today are commonly formed with a socketed head, square or hexagonal, adapted to receive a wrench by which torque can be applied thereto to drive them into position in the work. These sockets, however, if made large enough to receive a wrench by which the desired torque can be exerted, have the effect of weakening the bolt, and the bolt sometimes fails in service because of this condition. Moreover, no completely satisfactory method of locking these prior art bolts securely in place from the head end thereof has been found.

A primary object of the invention is therefore to provide a flush head bolt of increased strength and durability, having improved means by which it may be driven into the work, and having also effective provision for securely locking it against removal.

A further object is to provide such a bolt, and locking means therefor, capable of being readily removed from the work by a simple manipulation, without damage to the work.

A still further object of the invention is to provide a nut having lock-in and removal characteristics of the same general nature as the bolt of the invention.

The invention, as well as various additional objects thereof, and its various features and advantages, will be best understood from the ensuing description of a present preferred illustrative embodiment thereof, reference for this purpose being directed to the accompanying drawings, wherein.

Figure 3:
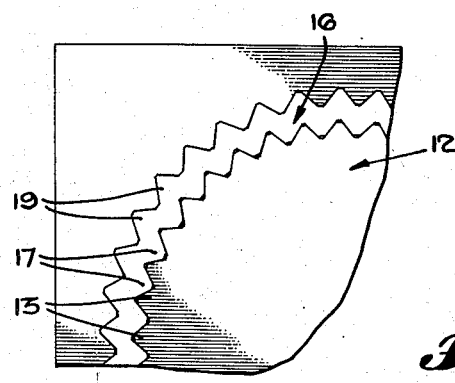
Figure 3 is a fragmentary plan view of the bolt head and locking ring of Figure 2.

Referring now to the drawings, numeral 10 designates generally the cylindrical shank of a machine screw or bolt, having a screwthreaded inner or forward end section 11, and having at the outer or upper end thereof an enlarged rounded head or body 12. This head 12 has at the top a band of longitudinally or axially directed locking formations, preferably in the form of serrations 13 of substantially triangular outline, such as illustrated best in Figure 3. In the present preferred embodiment, these serrations 13 occupy only substantially the upper 25% of the head 12, and in any event they will terminate substantially short of the lower end of the head, for a purpose presently to appear. Below the band of serrations 13, the head has a cylindrical section 14 of reduced diameter, the diameter of said section 14 being no greater than the root diameter of the serrations 13. If desired, the head 12 may be regarded as under-cut below the serrations 13 to provide a reduced neck portion 14 of no greater diameter than the root diameter of the serrations. Preferably, and as an added feature having an important function to appear presently, the head 12 has at the bottom an enlarged annular flange 15 preferably of approximately the same diameter as, or a little larger than, the peak or crest diameter of the serrations 13.

Figure 1:
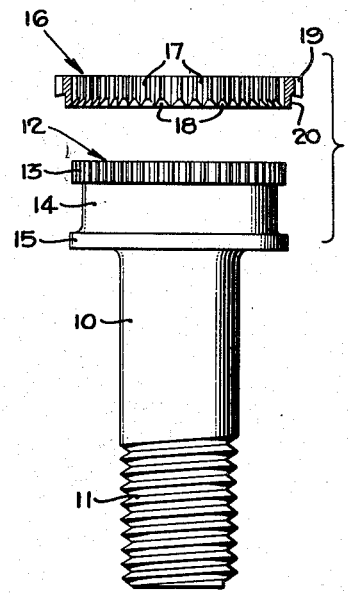
Figure 1 is an exploded view showing a bolt in accordance with the invention in side elevation, and a locking ring therefor in transverse section immediately above the head of the bolt.

Operable in conjunction with the bolt as thus described is a locking ring 16 having characteristics similar to the locking ring disclosed in my prior Patent Number 2,400,318, issued May 14, 1946. This locking ring 16 has internal longitudinally or axially directed locking formations adapted to mate or mesh with the locking formations on the head of the bolt. In the preferred use of the serrations 13 on the bolt, these internal locking formations in the locking ring 16 will of course also be serrations, as indicated by the reference numeral 17. To facilitate engagement of the locking ring 16 with the serrations on the bolt head, the serrations 17 are preferably chamfered, as indicated at 18. The locking ring 16 is also provided with external serrations 19, also preferably of substantially triangular formation (see Figure 3) and these serrations 19 preferably extend from the upper plane of the locking ring to a point a little below the middle thereof, where they terminate to form the ring with a reduced pilot portion 20 for a purpose to appear hereinafter. As will be seen from an inspection of Figure 1, the pilot formation 20 is actually, preferably, of slightly less diameter than the root diameter of the serrations 19. These serrations 19 are designed to constitute broaching elements adapted to cut their way into the walls of a counterbore into which the head of the bolt is installed, as will presently be described.

Figure 2:
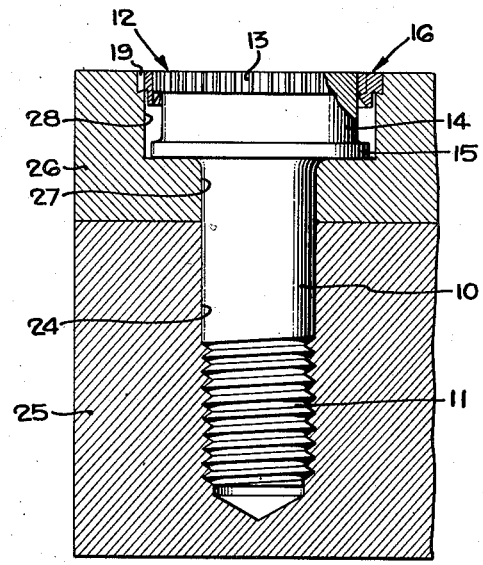
Figure 2 is a view showing the bolt of the invention installed, the bolt being again shown in side elevation, and the locking ring in medial section.
Figure 4:
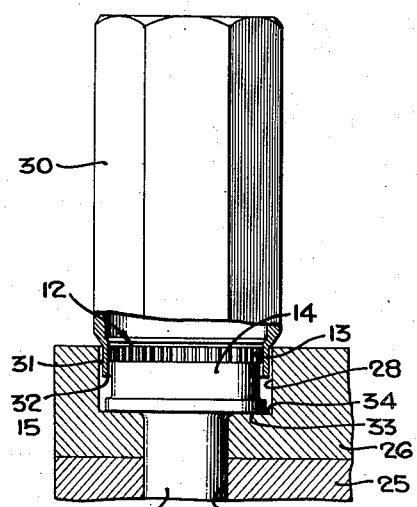
Figure 4 is a view similar to Figure 2 showing the bolt being driven into position by the installing wrench.

In Figures 2, 4 et seq., the bolt has been shown as threaded into a screwthreaded bore 24 in a body 25, and as securing to said body 25 a member 26 which has been bored at 27 to pass the bolt, and which has also been counterbored at 28 on a diameter sufficient to accept the bolt head and locking ring, and to a depth sufficient to receive the bolt head in a flush position. The member 26 will be understood to be a member of somewhat softer characteristics than that of the locking ring, to permit broaching by external serrations 19 of the latter. In particular, the counterbore 28 is substantially the same diameter as the root diameter of the external serrations 19 of the locking ring.

Figure 4 illustrates the procedure and implement employed to install the bolt, the numeral 30 indicating an installing wrench having a reduced thin-walled end section 31 defining a socket formed with internal serrations 32 adapted to receive and mesh with the serrations 13 on the bolt head. It will readily be understood how this wrench is engaged with the serrations 13, and how it is employed within the counterbore 28 to turn the bolt down until its shoulder 33 engages the upwardly facing shoulder 34 formed by the counterbore 28.

Figure 5:
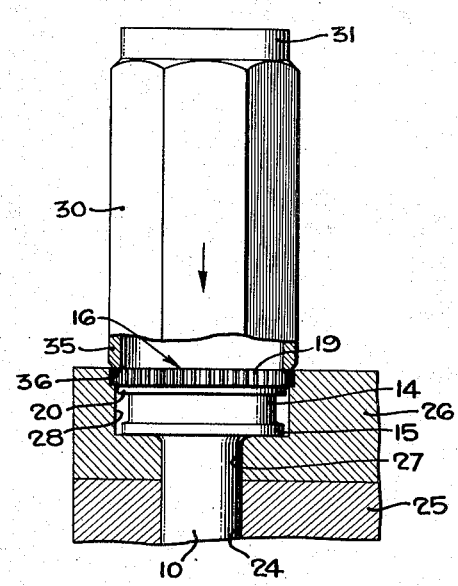
Figure 5 is a similar view, but showing the locking ring being driven into position by the wrench used in inverted position.

Figure 5 shows the locking ring 16 after being driven into position by using the other end portion 35 of the wrench tool 30 as a driving tool. This end portion 35 of the tool 30 has an annular driving face 36 adapted to engage the upper face of the locking ring 16, and it will be understood that the procedure is first to drop the pilot portion 20 into the annular space between the serrated portion 13 of the bolt and the wall of the counterbore, the chamfer at 18 facilitating the entry. The under-sides of the serrations 19 will at first engage the upper face of the member 26 around the outside of the counterbore. The tool 30 is then hammered to drive the ring downwardly to the position illustrated in Figures 2 and 5, it being appreciated that the serrations 19 function as broaching elements to cut their way into the side walls of the counterbore 28. Thus, the locking ring is engaged in intimate relationship with the material of the member 26, in such a way that it will not loosen or become displaced in service. It will further be appreciated that the bolt is locked securely against turning by the locking ring, as well as being locked against axial movement by its screw threads 11. The bolt is thus completely immobilized against the slightest movement with reference to the bodies 25 and 26, and even the slightest degree of play, such as in time will operate to loosen many types of fastening devices, is positively prevented.

Figure 6:
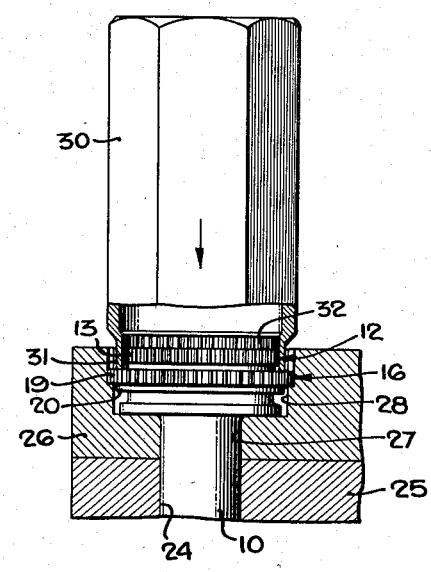
Figure 6 is a similar view but showing the locking ring having been driven downwardly by the same installing tool to permit removal of the bolt.
Figure 7:
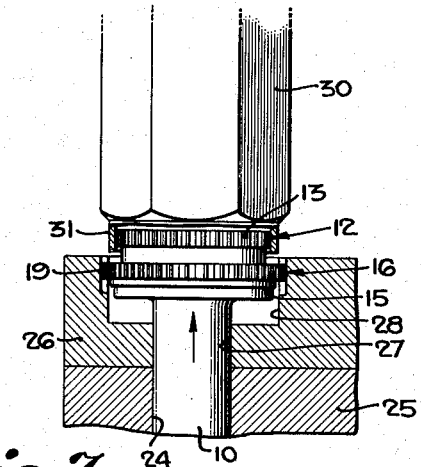
Figure 7 shows the procedure of removing the bolt and locking ring from the work.

One of the principal features of novelty of the present device is the provision whereby the bolt may be readily removed after having been permanently locked in place by the locking ring 16. Figures 6 and 7 show how this operation is performed, Figure 6 showing the wrench tool 30 again used with its thin-walled internally serrated end portion engaged with the bolt. The operation is performed by accurately locating the wrench on the bolt head, with its serrated socket in alinement with the serrations 13 of the bolt head. By then driving it downwardly, using any convenient striking tool, the locking ring 16 is driven downwardly from its original locking position of Figure 5 to such a position as illustrated in Figure 7, where the serrated portion 13 of the bolt is clear of the locking ring. The wrench tool 30 is then simply turned to unscrew the bolt from the work. The flange 15, when provided, operates in this procedure to engage the locking ring 16 and lift it out of the counterbore, as illustrated in Figure 7. It will of course be evident that in the event the flange 15 is omitted, the bolt will be completely unscrewed from the work by the operation described, but that the locking ring would be left in the position of Figure 6. It could then be pried out of the socket by a very simple operation. It is, however, of very great advantage to employ the flange 15 on the head of the bolt for the purpose of engaging the locking ring and lifting it out of the socket at the same time that the bolt is removed from the work.

Figure 8:
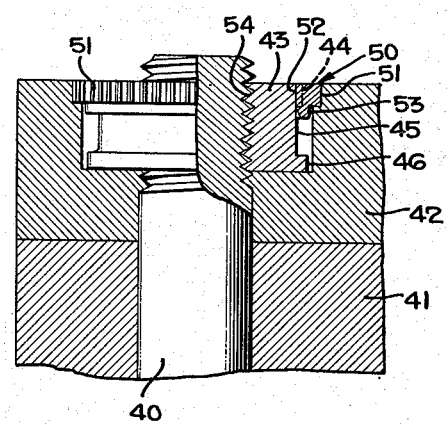
Figure 8 is a view, partially in three-quarter section, showing the application of the invention to a nut.

Figure 8 shows the application of the invention to a nut. In this figure, numeral 40 designates the threaded shank of a bolt, extending up through members 41 and 42 from below. Numeral 43 designates the nut of the invention, and it will be seen that the body of this nut has the same contour and features as the head or enlarged body 12 of the bolt of Figure 1. Thus, the nut has upper serrated section 44, reduced or under-cut cylindrical portion 45 below serrated portion 44, and enlarged ring-removing flange 46 at the bottom. Used with this nut is a locking ring 50 identical with the ring 16 previously described, and which will be seen to have external broaching serrations 51, internal serrations 52 adapted to mesh with serrations 44 on the nut, reduced pilot portion 53, and, of course, internally threaded bore 54 adapted for engagement with the threaded shank of the bolt 40. The procedure of installing the nut is in all respect similar to that already described in connection with the bolt, and a repetition will not be required.

A noteworthy feature of the invention is that the bolt, or nut, as the case may be, may always be reinstalled, using the same locking ring, and the reinstallation will leave the bolt or nut as secure as it was in the first instance. This is owing to the fact that with even the most care in manufacture, the serrations on the locking ring will not be identical in size, shape, and spacing, nor will the ring be perfectly round. On reinstallation, the ring almost never goes back in exactly the same position as it was in originally, and because of the minor distortions mentioned, there is accordingly adequate tightness of fit on reinstallation.

Certain present illustrative forms of the invention have now been described, but it will be understood that these are for illustrative purposes only, and that various changes in design, structure and arrangement may be made without departing from the spirit and scope of the invention.

I claim:

1. A fastening element embodying a screwthreaded cylindrical shank, an enlarged circular head integrally formed at one end thereof, a band of longitudinally directed locking serrations formed around an outer extent of said head, said head also having, adjacent said band of serrations, a reduced peripheral extent of no greater diameter than the root diameter of the serrated portion of said head, a separate locking ring having external longitudinally directed broaching serrations and longitudinally directed internal serrations adapted to mesh with said serrations on said head, said reduced inner extent of said head being of a width dimension, measured axially of said head, at least as great as the length of the internal serrations on the locking ring, whereby the intermeshing locking engagement between the head serrations and the ring serrations can be broken by axial movement of the locking ring to a position opposite said reduced peripheral extent of said head, thereby permitting relative rotation of said head within said ring, and a radially projecting portion on said head between said reduced extent and said shank adapted to engage under said locking ring to lift the same from the work when the head and shank are unscrewed therefrom.

2. A fastening element embodying a screw-threaded cylindrical shank, an enlarged circular head integrally formed at one end thereof, a band of longitudinally directed locking serrations formed around an outer extent of said head, said head also having, adjacent said band of serrations, a reduced peripheral extent of no greater diameter than the root diameter of the serrated portion of said head, a separate locking ring having external longitudinally directed broaching serrations and longitudinally directed internal serrations adapted to mesh with said serrations on said head, said reduced inner extent of said head being of a width dimension, measured axially of said head, at least as great as the length of the internal serrations on the the locking ring, whereby the intermeshing locking engagement between the head serrations and the ring serrations can be broken by axial movement of the locking ring to a position opposite said reduced peripheral extent of said head, thereby permitting relative rotation of said head within said ring, and a radially projecting flange of a diameter sufficient to underlie a portion of said locking ring formed on said head between said reduced extent of said body and said shank.

3. A fastening element embodying a body of essentially circular outline, a band of longitudinally directed locking serrations formed around an outer extent thereof, said body having immediately adjacent and inward of said serrations a reduced peripheral extent of no greater diameter than the root diameter of the serrated portion of said head, a separate locking ring having external longitudinally directed broaching serrations and longitudinally directed internal serrations adapted to mesh with said serrations on said body, said reduced extent of said body being of a width dimension, measured axially of said head, at least as great as the length of the internal serrations on the locking ring, and a radially projecting flange of a diameter sufficient to underlie a portion of said locking ring formed on said body on the opposite side of said reduced extent of said body from said serrated band.

4. A fastening element embodying a screw-threaded cylindrical shank, an enlarged integral head at one end thereof, said head having an outer extent formed with longitudinally directed locking formations, and a peripheral undercut extent adjacent and inward of said locking formations, a separate locking ring having external longitudinally directed broaching serrations, and internal longitudinally directed locking formations adapted to mate with said locking formations on said head to lock said head and ring against relative rotation, said undercut extent of said head being of a dimension, measured axially of said head, at least as great as the length of the internal serrations on the locking ring, and said locking ring being movable axially along said head to a position beyond said locking formations on said head and opposite said undercut extent of said head, where said head is free to turn within said ring, and a radially projecting portion on said head between said undercut extent and shank adapted to underlie at least a portion of said locking ring to lift the same from the work when the head and shank are unscrewed therefrom.

5. A fastening element embodying a body of essentially circular outline, longitudinally directed locking formations formed around an outer extent of said body, and a peripheral undercut extent adjacent and inward of said locking formations, a separate locking ring having external longitudinally directed broaching serrations, and internal longitudinally directed locking formations adapted to mate with said locking formations on said body, said undercut extent of said body being of a dimension, measured axially of said head, at least as great as the internal serrations on the locking ring, said locking ring being movable axially along said body to a position beyond said locking formations on said body and opposite said undercut extent of said body, where said body is free to turn within said ring, and a radially projecting portion on said head on the opposite side of said undercut extent from said locking formations, said radially projecting portion underlying said locking ring to engage and lift the same from the work when the head and shank are unscrewed therefrom.

JOSEPH ROSAN.

REFERENCES CITED

The following references are of record in the file of this patent:

UNITED STATES PATENTS

| Number | Name | Date |
|---|---|---|
| 2,359,555 | Herreshoff et al. | Oct. 3, 1944 |
| 2,400,318 | Rosan | May 14, 1946 |